(12) United States Patent
Ohsawa et al.

(10) Patent No.: US 11,011,744 B2
(45) Date of Patent: May 18, 2021

(54) NON-AQUEOUS ELECTROLYTE SECONDARY BATTERY, METHOD OF EVALUATING NEGATIVE ELECTRODE COMPOSITE MATERIAL LAYER, AND METHOD OF PRODUCING NON-AQUEOUS ELECTROLYTE SECONDARY BATTERY

(71) Applicant: TOYOTA JIDOSHA KABUSHIKI KAISHA, Toyota (JP)

(72) Inventors: Ryosuke Ohsawa, Okazaki (JP); Akihiro Taniguchi, Ashiya (JP); Kaoru Inoue, Hirakata (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 26 days.

(21) Appl. No.: 16/515,917

(22) Filed: Jul. 18, 2019

(65) Prior Publication Data

US 2020/0028160 A1   Jan. 23, 2020

(30) Foreign Application Priority Data

Jul. 19, 2018 (JP) .............................. JP2018-135863

(51) Int. Cl.
*H01M 4/00* (2006.01)
*H01M 4/36* (2006.01)
(Continued)

(52) U.S. Cl.
CPC ........... *H01M 4/364* (2013.01); *H01M 4/133* (2013.01); *H01M 4/483* (2013.01); *H01M 4/587* (2013.01);
(Continued)

(58) Field of Classification Search
CPC ....... H01M 10/0525; H01M 2004/027; H01M 4/483; H01M 4/13; H01M 4/364; H01M 60/10; H01M 4/622
See application file for complete search history.

(56) References Cited

U.S. PATENT DOCUMENTS

2015/0340687 A1* 11/2015 Put ........................ H01M 4/587
                                                              429/231.5
2018/0198159 A1   7/2018 Azami
2019/0207209 A1*  7/2019 Venkatachalam ..... H01M 4/131

FOREIGN PATENT DOCUMENTS

JP    2012-014993 A    1/2012
JP    2015-156293 A1   8/2015
(Continued)

*Primary Examiner* — Cynthia H Kelly
*Assistant Examiner* — Monique M Wills
(74) *Attorney, Agent, or Firm* — Sughrue Mion, PLLC (57) ABSTRACT

A non-aqueous electrolyte secondary battery includes at least a negative electrode composite material layer. The negative electrode composite material layer includes a negative electrode active material, a conductive material, and a binder. The negative electrode active material includes a silicon oxide material and a graphite material. The negative electrode composite material layer has a BET specific surface area not smaller than 3.5 m²/g and not greater than 5.0 m²/g. In an orthogonal coordinate system having an abscissa representing the elongation of the negative electrode composite material layer and an ordinate representing the electrical resistance of the negative electrode composite material layer, an elongation at a bending point (Cp) in the plot is 12% or higher.

8 Claims, 5 Drawing Sheets

(51) Int. Cl.

| | | |
|---|---|---|
| *H01M 4/587* | (2010.01) | |
| *H01M 4/48* | (2010.01) | |
| *H01M 4/62* | (2006.01) | |
| *H01M 4/133* | (2010.01) | |
| *H01M 10/0525* | (2010.01) | |
| *H01M 4/02* | (2006.01) | |

(52) U.S. Cl.
CPC ........... *H01M 4/622* (2013.01); *H01M 4/625* (2013.01); *H01M 10/0525* (2013.01); *H01M 2004/021* (2013.01); *H01M 2004/027* (2013.01)

(56) References Cited

FOREIGN PATENT DOCUMENTS

| JP | 2017-199657 A | 11/2017 |
|---|---|---|
| WO | 2017/007013 A1 | 1/2017 |

\* cited by examiner

NON-AQUEOUS ELECTROLYTE SECONDARY BATTERY, METHOD OF EVALUATING NEGATIVE ELECTRODE COMPOSITE MATERIAL LAYER, AND METHOD OF PRODUCING NON-AQUEOUS ELECTROLYTE SECONDARY BATTERY

This nonprovisional application claims priority to Japanese Patent Application No. 2018-135863 filed on Jul. 19, 2018, with the Japan Patent Office, the entire contents of which are hereby incorporated by reference.

BACKGROUND

Field

The present disclosure relates to a non-aqueous electrolyte secondary battery, a method of evaluating a negative electrode composite material layer, and a method of producing a non-aqueous electrolyte secondary battery.

Description of the Background Art

Japanese Patent Laying-Open No. 2017-199657 discloses a negative electrode composite material layer including a silicon oxide material, a graphite material, a conductive material, and a binder.

SUMMARY

Typically, a negative electrode composite material layer includes a negative electrode active material as a main component. As a negative electrode active material, graphite material is conventionally used. In recent years, silicon oxide material has been investigated for use as a negative electrode active material. Silicon oxide material may have a higher specific capacity than that of graphite material. Therefore, using silicon oxide material and graphite material as a mixture may increase battery capacity compared to using graphite material alone.

However, silicon oxide material tends to undergo a great extent of volume change during charge and discharge. Therefore, when a mixed system of silicon oxide material and graphite material is adopted, every charge and every discharge cause a great change in the distance between a silicon oxide material and a graphite material. Between a silicon oxide material and a graphite material within a negative electrode composite material layer in an initial state, a conductive path may be present. As the distance between the silicon oxide material and the graphite material increases, the conductive path is stretched. This may cause loss of the conductive path. Loss of such conductive paths may promote capacity deterioration; in other words, it may cause degradation in charge-discharge cycling performance.

If a great amount of conductive material is added to a negative electrode composite material layer, a large number of conductive paths may be formed. In the presence of a large number of conductive paths, frequency of conductive paths during charge-discharge cycles may be relatively low. However, the presence of a great amount of conductive material in the negative electrode composite material layer may increase the specific surface area of the negative electrode composite material layer. The increase in the specific surface area tends to promote degradation reaction of non-aqueous electrolyte during high-temperature storage; in other words, it tends to degrade high-temperature storage properties.

An object of the present disclosure is to improve charge-discharge cycling performance of a non-aqueous electrolyte secondary battery that includes a negative electrode composite material layer including a silicon oxide material and a graphite material, while mitigating degradation in high-temperature storage properties.

In the following, the technical structure and the effects according to the present disclosure are described. It should be noted that the action mechanism according to the present disclosure includes presumption. Therefore, the scope of claims should not be limited by whether or not the action mechanism is correct.

[1] A non-aqueous electrolyte secondary battery includes at least a negative electrode composite material layer. The negative electrode composite material layer includes a negative electrode active material, a conductive material, and a binder. The negative electrode active material includes a silicon oxide material and a graphite material. The negative electrode composite material layer has a BET specific surface area not smaller than 3.5 $m^2/g$ and not greater than 5.0 $m^2/g$. In a plot made for the negative electrode composite material layer, an elongation at a bending point in the plot is 12% or higher. The plot is made by the following procedure: stretching the negative electrode composite material layer by 1% in a direction orthogonal to a thickness direction of the negative electrode composite material layer; performing measurement of an electrical resistance of the negative electrode composite material layer thus stretched; repeating the stretching in the same direction while each stretching is followed by the measurement; and making a plot of values thus obtained by the measurement. The plot is made on an orthogonal coordinate system that has an abscissa representing the elongation of the negative electrode composite material layer and an ordinate representing the electrical resistance of the negative electrode composite material layer.

The bending point refers to one of two adjacent points in the plot that differ from each other in electrical resistance by greater than 0.1Ω. The bending point is the one with the smaller elongation.

Figure 1:
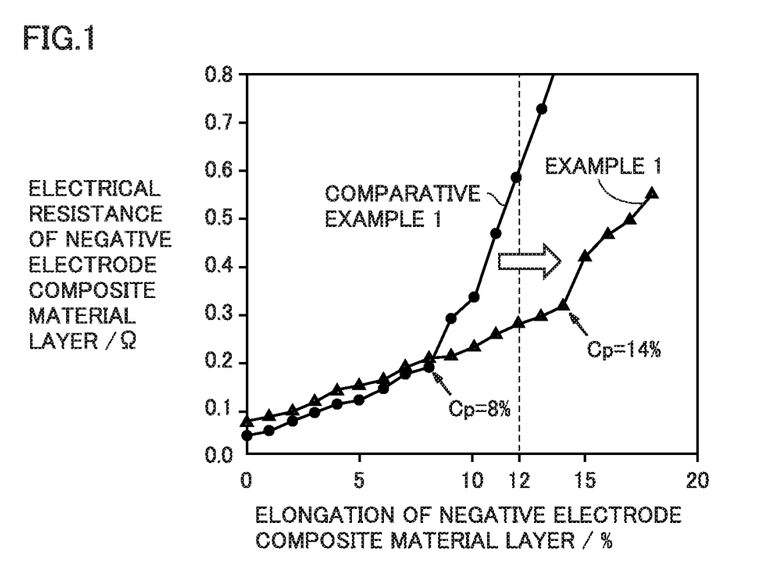
FIG. 1 illustrates an orthogonal coordinate system that has an abscissa representing elongation of a negative electrode composite material layer and an ordinate representing electrical resistance of the negative electrode composite material layer.

FIG. 1 illustrates an orthogonal coordinate system that has an abscissa representing elongation of a negative electrode composite material layer and an ordinate representing electrical resistance of the negative electrode composite material layer. According to the present disclosure, a change in electrical resistance of the negative electrode composite material layer is measured against elongation of the negative electrode composite material layer. As the elongation of the negative electrode composite material layer increases, the electrical resistance of the negative electrode composite material layer also increases. It may be because conductive paths between negative electrode active material within the negative electrode composite material layer may be gradually lost as the negative electrode composite material layer is progressively stretched. When the elongation of the negative electrode composite material layer reaches a certain value, the electrical resistance starts a sharp increase. The point at which the electrical resistance starts a sharp increase is called a bending point (Cp). At the bending point (Cp), many conductive paths may become unable to withstand the stretching any longer and thereby be lost all at once.

The elongation at a bending point may indicate the strength of the conductive paths to withstand stretching. The greater the elongation at a bending point is, the smaller the likelihood of loss of the conductive paths may be. In the configuration in which the elongation at a bending point is 12% or higher, conductive paths may withstand the stretching that is caused by a volume change of a silicon oxide material. This means that when a mixed system of a silicon oxide material and a graphite material is adopted, conductive paths may be likely to continue existing during charge-discharge cycles; thereby charge-discharge cycling performance may be improved.

The elongation at a bending point may be controlled by adjusting the composition of the negative electrode composite material layer, for example. The composition of the negative electrode composite material layer is adjusted so as to achieve a BET specific surface area of the negative electrode composite material layer of not smaller than 3.5 $m^2/g$ and not greater than 5.0 $m^2/g$. In the configuration in which the BET specific surface area is smaller than 3.5 $m^2/g$, elongation at a bending point tends not to be 12% or greater. It may be because there are not enough conductive paths. In the configuration in which the BET specific surface area is greater than 5.0 $m^2/g$, degradation reaction of non-aqueous electrolyte may be promoted during high-temperature storage. In other words, high-temperature storage properties may be degraded.

As discussed above, the non-aqueous electrolyte secondary battery according to the present disclosure may have an improved charge-discharge cycling performance with a mitigated degradation in high-temperature storage properties.

[2] An amount of the binder expressed in part by mass may be higher than an amount of the conductive material expressed in part by mass.

When the amount of the binder is higher than the amount of the conductive material, an increase in the BET specific surface area due to addition of the conductive material tends to be mitigated. It may be because the binder coats part of the conductive material. Therefore, when the amount of the binder is higher than the amount of the conductive material, elongation at a bending point may tend to be great and the BET specific surface area may tend to be small.

[3] The amount of the binder may be, for example, not lower than 3 parts by mass and not higher than 5 parts by mass relative to 100 parts by mass of the negative electrode active material.

[4] The binder may include carboxymethylcellulose (CMC) and styrene-butadiene rubber (SBR), for example.

[5] The conductive material may include carbon nanotube (CNT) and graphene, for example.

The graphene is in the form of flakes. The graphene may form conductive paths that link particles (of the negative electrode active material) to each other. The CNT is in the form of fine tubes. The CNT may adhere to surfaces of the particles and thereby serve as contact points between the particles and the graphene. When CNT and graphene are used in combination, conductive paths capable of withstanding stretching may be formed. In other words, elongation at a bending point may increase.

[6] A method of evaluating a negative electrode composite material layer includes at least (a) and (b) below:

(a) preparing a negative electrode composite material layer; and (b) performing evaluation of the negative electrode composite material layer.

The negative electrode composite material layer includes a negative electrode active material, a conductive material, and a binder. The negative electrode active material includes a silicon oxide material and a graphite material.

The negative electrode composite material layer is stretched by 1% in a direction orthogonal to a thickness direction of the negative electrode composite material layer. An electrical resistance of the negative electrode composite material layer thus stretched is measured. The stretching is repeated in the same direction while each stretching is followed by the measurement. Values thus obtained by the measurement are plotted on an orthogonal coordinate system that has an abscissa representing the elongation of the negative electrode composite material layer and an ordinate representing the electrical resistance of the negative electrode composite material layer. Based on the elongation at a bending point in the plot, the negative electrode composite material layer is evaluated.

The bending point refers to one of two adjacent points in the plot that differ from each other in electrical resistance by greater than 0.1Ω. The bending point is the one with the smaller elongation.

The method of evaluating a negative electrode composite material layer according to the present disclosure enables evaluation of how well the conductive paths withstand the stretching that is caused by a volume change of the silicon oxide material.

[7] A method of producing a non-aqueous electrolyte secondary battery includes at least (A) and (B) below:

(A) performing evaluation of the negative electrode composite material layer using the method of evaluating a negative electrode composite material layer according to [6] above; and (B) producing a non-aqueous electrolyte secondary battery including at least the negative electrode composite material layer.

The negative electrode composite material layer has an elongation at a bending point of 12% or higher. The negative electrode composite material layer has a BET specific surface area not smaller than 3.5 $m^2/g$ and not greater than 5.0 $m^2/g$.

The method of producing a non-aqueous electrolyte secondary battery according to the present disclosure may enable improvement of charge-discharge cycling performance while mitigating degradation in high-temperature storage properties.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

In the following, embodiments according to the present disclosure (herein called "present embodiment") are described. However, the description below does not limit the scope of claims.

<Non-Aqueous Electrolyte Secondary Battery>

Figure 2:
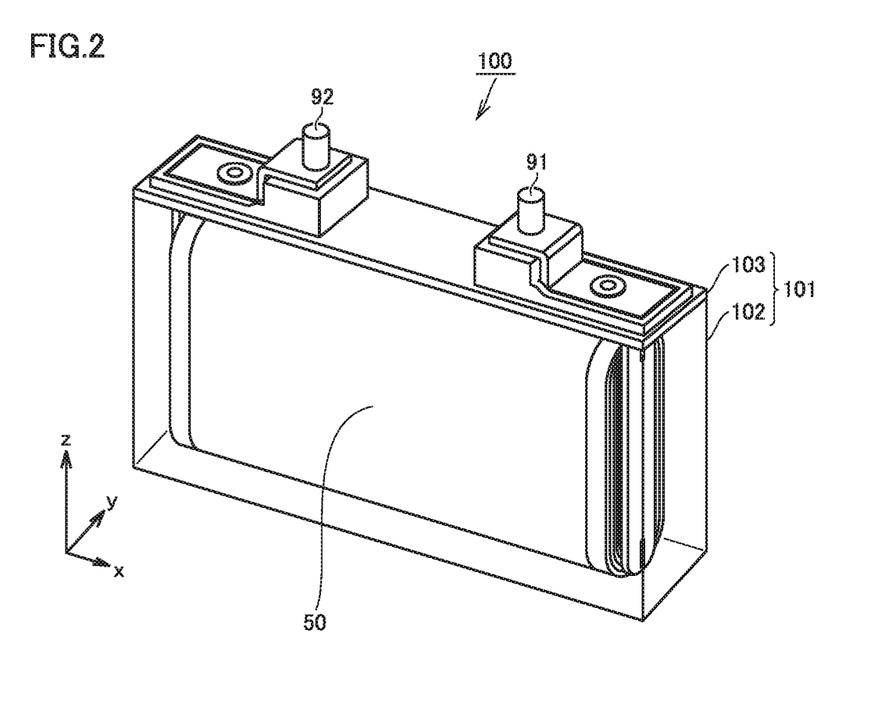
FIG. 2 is a schematic view illustrating the structure of a non-aqueous electrolyte secondary battery according to the present embodiment.

FIG. 2 is a schematic view illustrating the structure of a non-aqueous electrolyte secondary battery according to the present embodiment.

A battery 100 is a non-aqueous electrolyte secondary battery. Battery 100 includes a casing 101. Casing 101 is hermetically sealed. Casing 101 is prismatic (a flat, rectangular parallelepiped). Alternatively, casing 101 may be cylindrical, for example. Casing 101 may be made of aluminum (Al) alloy, for example. Casing 101 may be, for example, a pouch made of an aluminum-laminated film. In other words, battery 100 may be a laminate-type battery.

Casing 101 includes a container 102 and a cap 103. Cap 103 is bonded to container 102 by laser beam welding, for example. Cap 103 is equipped with a positive electrode terminal 91 and a negative electrode terminal 92. Cap 103 may be further equipped with a liquid inlet, a gas-discharge valve, and a current interrupt device (CID), for example. Casing 101 accommodates an electrode array 50 and a non-aqueous electrolyte (not shown).

Figure 3:
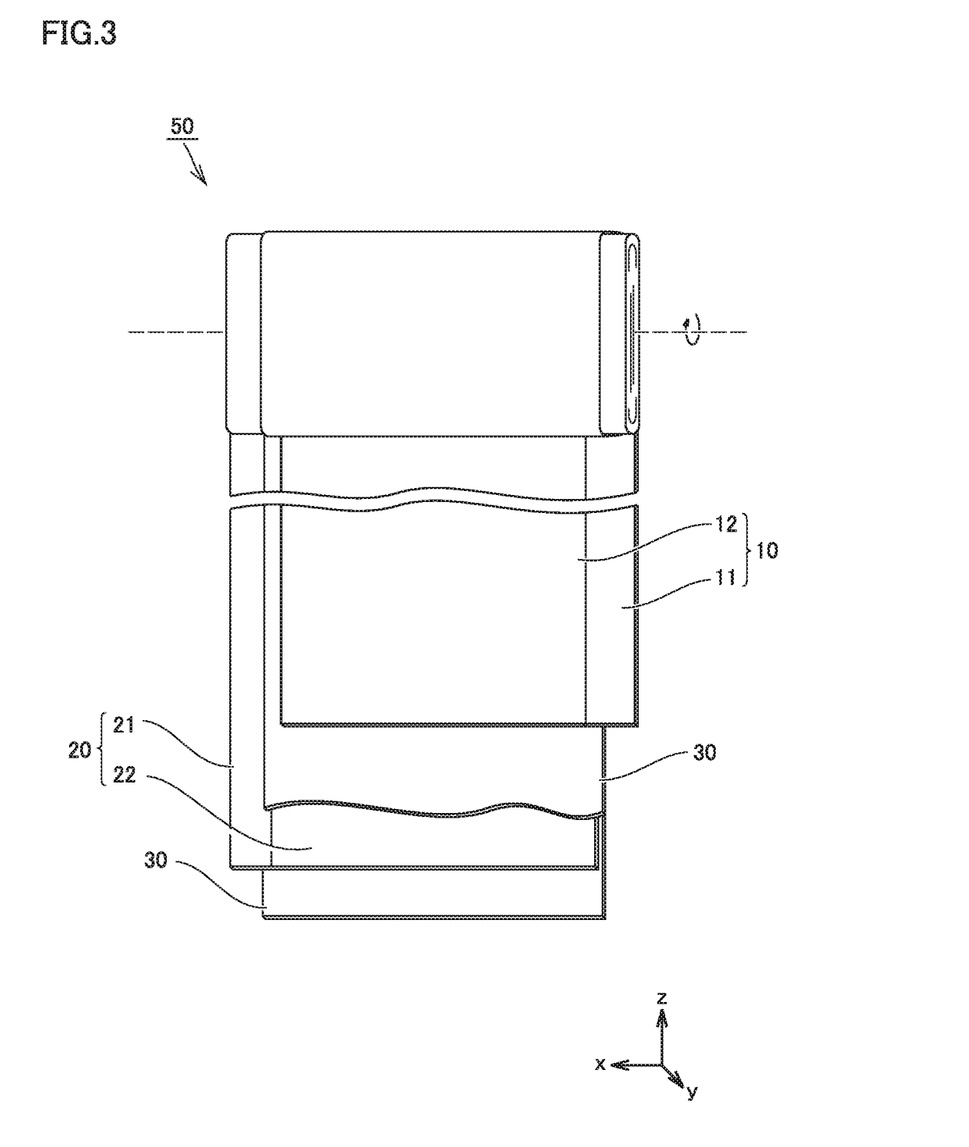
FIG. 3 is a schematic view illustrating the structure of an electrode array according to the present embodiment.

FIG. 3 is a schematic view illustrating the structure of an electrode array according to the present embodiment.

Electrode array 50 is a wound-type one. Electrode array 50 is formed by stacking a positive electrode 10, a separator 30, a negative electrode 20, and separator 30 in this order and then winding them in a spiral fashion.

Electrode array 50 may be a stack-type one. More specifically, electrode array 50 may be formed by alternately stacking one positive electrode 10 and one negative electrode 20 and then repeating this alternate stacking process more than once. In each space between positive electrode 10 and negative electrode 20, separator 30 is interposed.

<<Negative Electrode>>

Figure 4:
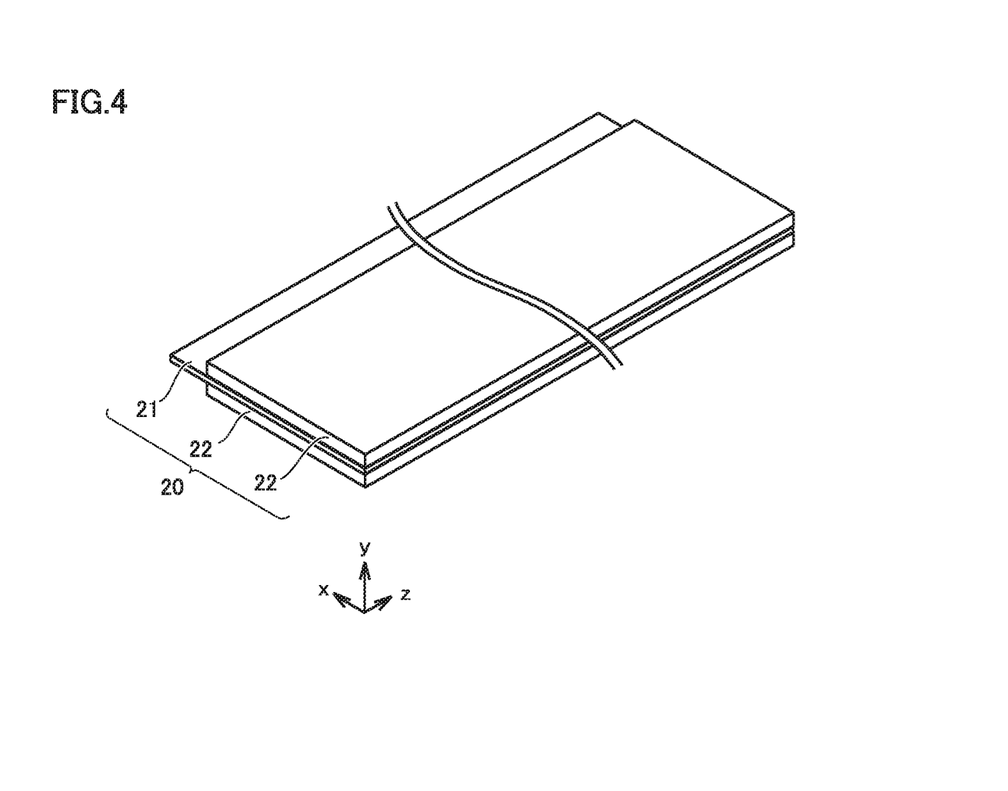
FIG. 4 is a schematic view illustrating the structure of a negative electrode according to the present embodiment.

FIG. 4 is a schematic view illustrating the structure of a negative electrode according to the present embodiment.

Negative electrode 20 is in sheet form. Negative electrode 20 includes at least a negative electrode composite material layer 22. In other words, battery 100 includes at least negative electrode composite material layer 22. Negative electrode 20 may further include a negative electrode current collector 21, for example.

Negative electrode current collector 21 may be made of copper (Cu) foil, for example. Negative electrode current collector 21 may have a thickness not smaller than 5 μm and not greater than 50 μm, for example. The part of negative electrode current collector 21 protruding from negative electrode composite material layer 22 in the x-axis direction in FIG. 4 may be used for connection to negative electrode terminal 92 (FIG. 2).

<<Negative Electrode Composite Material Layer>>

Negative electrode composite material layer 22 may be disposed on a surface of negative electrode current collector 21. Negative electrode composite material layer 22 may be formed by applying a coating material including a negative electrode active material and the like to a surface of negative electrode current collector 21. Negative electrode composite material layer 22 may be disposed on one side of negative electrode current collector 21. Negative electrode composite material layer 22 may be disposed on both sides of negative electrode current collector 21. Negative electrode composite material layer 22 may have a thickness not smaller than 10 μm and not greater than 200 μm, for example.

<Elongation at Bending Point>

Negative electrode composite material layer 22 according to the present embodiment has an elongation at a bending point of 12% or higher. With the elongation at a bending point being 12% or higher, charge-discharge cycling performance may be improved. It may be because conductive paths between a silicon oxide material and a graphite material tend not to be lost.

The elongation at a bending point is measured by the procedure described below.

A polyethylene terephthalate (PET) film is prepared. The PET film has a thickness of 50 μm. The PET film may be, for example, "Lumirror" (trade name) manufactured by Toray Industries, Inc. Alternatively, a PET film with equivalent quality may be prepared.

A double-sided tape is prepared. The double-sided tape may be, for example, "NICETACK" (trade name) manufactured by Nichiban Co., Ltd. Alternatively, a double-sided tape with equivalent quality may be prepared. The double-sided tape includes a first adhesive side and a second adhesive side. The second adhesive side is the opposite side to the first adhesive side. The first adhesive side is affixed to the PET film. The second adhesive side is affixed to a surface of negative electrode composite material layer 22. The PET film, together with negative electrode composite material layer 22, is peeled off negative electrode current collector 21. Thus, a specimen raw sheet is obtained. From the specimen raw sheet, a specimen with predetermined planar dimensions (140 mm in length, 15 mm in width) is cut out.

A tensile tester is prepared. The tensile tester may be a universal tester. The universal tester refers to a tester that is adapted for not only tensile tests but also other tests, such as compression tests. The tensile tester may be, for example, a tensile and compression testing machine (trade name "Technograph") manufactured by MinebeaMitsumi Inc. Alternatively, a tensile tester with equivalent functions may be used.

Figure 5:
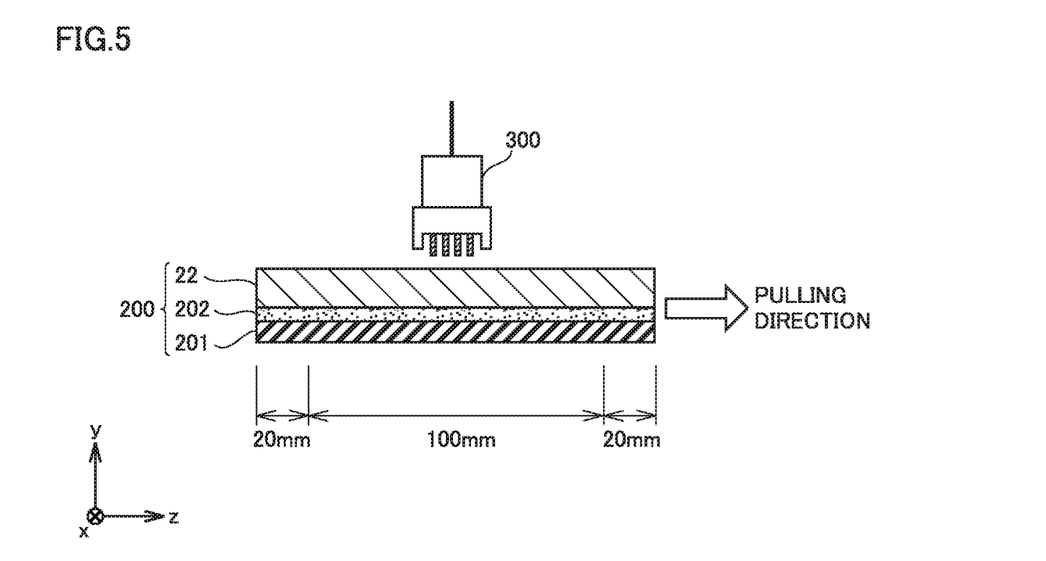
FIG. 5 is a schematic sectional view of a specimen.

FIG. 5 is a schematic sectional view of a specimen.

A specimen 200 includes a PET film 201, a double-sided tape 202, and negative electrode composite material layer 22. Each end of specimen 200 is held with a chuck (holding jig) of the tensile tester for a length of 20 mm in a longitudinal direction (in the z-axis direction in FIG. 5). The part of negative electrode composite material layer 22 not held with the chucks is 100 mm in length.

Specimen 200 is pulled in a direction orthogonal to a thickness direction of negative electrode composite material layer 22. The thickness direction refers to the y-axis direction in FIG. 5. The direction orthogonal to the thickness direction is the z-axis direction in FIG. 5. The term "orthogonal" means the state of being substantially orthogonal. The meaning of the term "orthogonal" is not limited to the state of being exact orthogonal in a geometric sense. The pulling direction may be deviated from the direction orthogonal to the thickness direction by about ±10°, for example.

The pulling is carried out in an environment at room temperature (20° C.±5° C.). The pulling speed is 5 mm/min. At the time when negative electrode composite material layer 22 is stretched by 1 mm (namely, when the elongation of negative electrode composite material layer 22 reaches 1%), the pulling is stopped. The amount of tensile load is not constant. The tensile load may be increased as the elongation increases.

After the pulling is stopped, the electrical resistance of negative electrode composite material layer 22 is measured in an environment at room temperature. The electrical resistance is measured by a four-probe method. For example, a resistivity meter equipped with a four-pin probe 300 is suitable for use. For example, any product from "Loresta" line manufactured by Mitsubishi Chemical Analytech Co., Ltd. may be used for the electrical resistance measurement. Alternatively, any other equivalent resistivity meter may be used for the electrical resistance measurement. The electrical resistance measurement is carried out at least three times. The arithmetic mean of these at least three measurements is used.

After the electrical resistance measurement, the pulling is resumed. At the time when negative electrode composite material layer 22 is stretched by 2 mm in total (namely, the elongation of negative electrode composite material layer 22 reaches 2% in total), the pulling is stopped again. After the pulling is thus stopped, the electrical resistance is measured.

The pulling and the electrical resistance measurement are repeated. More specifically, stretching negative electrode composite material layer 22 by 1% is repeated while each stretching is followed by the measurement of the electrical resistance of negative electrode composite material layer 22.

Measurement results are plotted on an orthogonal coordinate system that has an abscissa representing the elongation of negative electrode composite material layer 22 and an ordinate representing the electrical resistance of negative electrode composite material layer 22 (FIG. 1). Thus, a plot is created. Points in the plot may be connected by a straight line to create a line graph. In the plot, a bending point (Cp) is identified. The bending point (Cp) refers to one of two adjacent points in the plot that differ from each other in electrical resistance by greater than 0.1Ω. The bending point (Cp) is the one with the smaller elongation. If there are a plurality of bending points in the plot, the one with the smallest elongation is used.

Elongation at a bending point is measured for at least three specimens. The arithmetic mean of these at least three measurements is used.

As the elongation at a bending point increases, charge-discharge cycling performance may be improved. The elongation at a bending point may be not lower than 13%, for example. The upper limit to the elongation at a bending point is not particularly limited. The elongation at a bending point may be not higher than 14%, for example.

<BET Specific Surface Area>

The BET specific surface area of negative electrode composite material layer 22 according to the present embodiment is not smaller than 3.5 m²/g and not greater than 5.0 m²/g. In the configuration in which the BET specific surface area is smaller than 3.5 m²/g, elongation at a bending point tends not to be 12% or higher. It may be because there are not enough conductive paths. In the configuration in which the BET specific surface area is greater than 5.0 m²/g, degradation reaction of the non-aqueous electrolyte may be promoted during high-temperature storage. In other words, high-temperature storage properties may be degraded.

The BET specific surface area refers to a specific surface area measured by a BET multi-point method. The BET specific surface area is measured by a method in conformity with "JIS 6217-7:2013". As the specimen, a section of negative electrode composite material layer 22 with predetermined planar dimensions (10 mm in length, 2 mm in width) is used. The specimen may be cut out from negative electrode 20. In the configuration in which negative electrode composite material layer 22 is disposed on a surface of negative electrode current collector 21, an integrated section composed of negative electrode composite material layer 22 and negative electrode current collector 21 is used as the specimen. The measurement may be carried out with a typical specific surface area analyzer. Nitrogen gas is used as adsorption gas. Measurement of the BET specific surface area is carried out at least three times. The arithmetic mean of these at least three measurements is used.

<Composition of Negative Electrode Composite Material Layer>

Negative electrode composite material layer 22 includes a negative electrode active material, a conductive material, and a binder. By adjusting the composition of negative electrode composite material layer 22, for example, the elongation at a bending point and the BET specific surface area may be controlled.

(Negative Electrode Active Material)

The negative electrode active material includes a silicon oxide material and a graphite material. The silicon oxide material tends to undergo a great extent of volume change during charge and discharge. More specifically, the silicon oxide material swells to a great extent due to alloying reaction thereof with lithium (Li) ions and shrinks to a great extent due to dealloying reaction thereof from Li ions.

The silicon oxide material is typically in the form of particles (powder). The silicon oxide material may have a D50 not lower than 1 μm and not higher than 30 μm, for example. The "D50" refers to a particle size in volume-based particle size distribution at which the cumulative particle volume (accumulated from the side of small sizes) reaches 50% of the total particle volume. The D50 may be measured with a laser-diffraction particle size distribution analyzer, for example. The silicon oxide material may have a D50 not lower than 1 μm and lower than 10 μm, for example.

The silicon oxide material refers to a compound containing silicon (Si) and oxygen (O) as essential components. The silicon oxide material may be represented by, for example, the following formula (I):

$$SiO_x \qquad (I)$$

(where x satisfies 0<x<2).

In the above formula (I), x denotes the ratio of the concentration of O atoms to the concentration of Si atoms. x may be measured by Auger electron spectrometry, glow discharge mass spectrometry, or inductively coupled plasma atomic emission spectrometry, for example. Measurement of x may be carried out at least three times. The arithmetic mean of these at least three measurements may be used.

In the above formula (I), x may satisfy $0.5 \leq x \leq 1.5$, for example. x may satisfy $0.8 \leq x \leq 1.2$, for example. The silicon oxide material may be a compound consisting essentially of Si and O. The silicon oxide material may contain a trace amount of an element other than Si or O. The "trace amount" refers to an amount of 1 mol % or lower, for example. The element contained in a trace amount may be, for example, an element that is inevitably entrapped during synthesis of the silicon oxide material.

The graphite material occludes Li ions and releases Li ions. The graphite material is typically in the form of particles. The graphite material may have a D50 not lower than 1 μm and not higher than 30 μm, for example. For instance, the graphite material may have a D50 higher than that of the silicon oxide material. The graphite material may have a D50 not lower than 10 μm and not higher than 20 μm, for example.

The graphite material refers to a carbon material that includes graphite crystals and/or crystals similar to graphite crystals. The graphite material may include at least one selected from the group consisting of graphite, soft carbon, hard carbon, and the like. The graphite may be natural graphite, for example. The graphite may be artificial graphite, for example. As long as including graphite crystals and/or crystals similar to graphite crystals, the graphite material may further include, for example, amorphous carbon. For example, the graphite material may be natural graphite (particles) coated with amorphous carbon on its surface.

For example, the silicon oxide material and the graphite material may satisfy the following relation:

(Silicon oxide material):(graphite material)=1:99 to 99:1 (mass ratio).

For example, the silicon oxide material and the graphite material may satisfy the following relation:

(Silicon oxide material):(graphite material)=1:99 to 50:50 (mass ratio).

For example, the silicon oxide material and the graphite material may satisfy the following relation:

(Silicon oxide material):(graphite material)=1:99 to 20:80 (mass ratio).

For example, the silicon oxide material and the graphite material may satisfy the following relation:

(Silicon oxide material):(graphite material)=5:99 to 10:90 (mass ratio).

The negative electrode active material may consist essentially of the silicon oxide material and the graphite material. As long as including the silicon oxide material and the graphite material, the negative electrode active material may further include an additional negative electrode active material. The additional negative electrode active material may be silicon, silicon-based alloy, tin, tin oxide, tin-based alloy, and/or lithium titanium oxide, for example. The amount of the additional negative electrode active material may be, for example, not lower than 1 mass % and not higher than 50 mass % relative to the total amount of the negative electrode active material.

(Conductive Material)

The conductive material refers to a material capable of forming a conductive path within negative electrode composite material layer 22. The conductive material may be CNT, graphene, and/or carbon black, for example. The carbon black may be acetylene black (AB), furnace black, and/or thermal black, for example. Negative electrode composite material layer 22 may include only one type of the conductive material. Negative electrode composite material layer 22 may include two or more types of the conductive material.

The conductive material may include at least one selected from the group consisting of CNT and graphene, for example. The conductive material may include CNT and graphene, for example. With CNT and graphene both included in negative electrode composite material layer 22, conductive paths capable of withstanding stretching may be formed. The conductive material may consist essentially of CNT and graphene.

The CNT is in the form of fine tubes. CNT may have an average diameter not smaller than 0.4 nm and not greater than 40 nm, for example. The CNT may have an average length not smaller than 10 nm and not greater than 15 μm, for example. Each of the average diameter and the average length may be the average value attributed to ten CNT, for example. Each of the diameter and the length may be measured with a transmission electron microscope (TEM), for example.

The graphene is in the form of flakes. The graphene may have a D50 not lower than 2 μm and not higher than 20 μm, for example. The graphene may consist of, for example, a single graphene sheet. The graphene may be a stack of 2 to 30 graphene sheets, for example. The graphene may have an aspect ratio not lower than 150 and not higher than 700, for example. The aspect ratio herein refers to D50 divided by average thickness. The average thickness may be the average value attributed to ten flakes of graphene, for example. The thickness of the graphene may be measured with an atomic force microscope (AFM), for example.

The higher the amount of the conductive material is, the greater the elongation at a bending point tends to be. However, the higher the amount of the conductive material is, the greater the BET specific surface area of negative electrode composite material layer 22 tends to be. From the viewpoint of high-temperature storage properties as mentioned above, the BET specific surface area needs to be not greater than 5.0 $m^2/g$. The amount of the conductive material may be, for example, not lower than 1 part by mass and not higher than 5 parts by mass relative to 100 parts by mass of the negative electrode active material. The amount of the conductive material may be, for example, not lower than 1 part by mass and lower than 3 parts by mass relative to 100 parts by mass of the negative electrode active material. The amount of the conductive material may be, for example, not lower than 2 parts by mass and lower than 3 parts by mass relative to 100 parts by mass of the negative electrode active material.

(Binder)

The binder refers to a material that binds the components of negative electrode composite material layer 22 to each other. The binder may be CMC, SBR, polyacrylic acid (PAA), polyacrylic acid ester, and/or polyimide, for example. Negative electrode composite material layer 22 may include only one type of the binder. Negative electrode composite material layer 22 may include two or more types of the binder.

The binder may include CMC and SBR, for example. With CMC and SBR being used in combination, the BET specific surface area of negative electrode composite material layer 22 tends to be small. The binder may consist essentially of CMC and SBR.

The amount of the binder expressed in part by mass may be higher than the amount of the conductive material expressed in part by mass. When the amount of the binder is higher than the amount of the conductive material, the increase in the BET specific surface area due to addition of the conductive material tends to be mitigated. The amount of the binder may be, for example, not lower than 1 part by mass and not higher than 10 parts by mass relative to 100 parts by mass of the negative electrode active material. The amount of the binder may be, for example, not lower than 3 parts by mass and not higher than 5 parts by mass relative to 100 parts by mass of the negative electrode active material.

<<Positive Electrode>>

Figure 6:
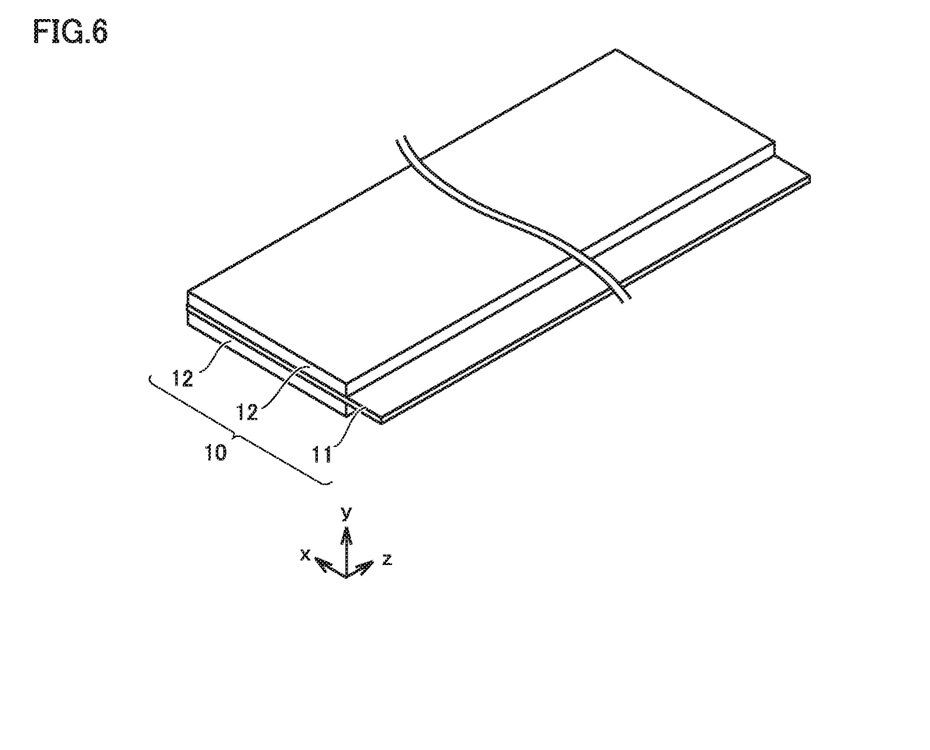
FIG. 6 is a schematic view illustrating the structure of a positive electrode according to the present embodiment.

FIG. 6 is a schematic view illustrating the structure of a positive electrode according to the present embodiment.

Positive electrode 10 is in sheet form. Positive electrode 10 includes at least a positive electrode composite material layer 12. Positive electrode 10 may further include a positive electrode current collector 11, for example.

Positive electrode current collector 11 may be an Al foil, for example. Positive electrode current collector 11 may have a thickness not smaller than 5 μm and not greater than 50 μm, for example. The part of positive electrode current collector 11 protruding from positive electrode composite material layer 12 in the x-axis direction in FIG. 6 may be used for connection to positive electrode terminal 91 (FIG. 2).

Positive electrode composite material layer 12 may be disposed on a surface of positive electrode current collector 11. Positive electrode composite material layer 12 may be formed by applying a coating material including a positive electrode active material and the like to a surface of positive electrode current collector 11. Positive electrode composite material layer 12 may be disposed on one side of positive electrode current collector 11. Positive electrode composite material layer 12 may be disposed on both sides of positive electrode current collector 11. Positive electrode composite material layer 12 may have a thickness not smaller than 10 μm and not greater than 200 μm, for example.

Positive electrode composite material layer 12 includes at least a positive electrode active material. The positive electrode active material is typically in the form of particles. The positive electrode active material may have a D50 not lower than 1 μm and not higher than 30 μm, for example. The positive electrode active material is not particularly limited. The positive electrode active material may be lithium cobalt oxide ($LiCoO_2$), lithium nickel oxide ($LiNiO_2$), lithium manganese oxide (such as $LiMnO_2$ and $LiMn_2O_4$), lithium nickel cobalt manganese oxide (such as $LiNi_{1/3}Co_{1/3}Mn_{1/3}O_2$ and $LiNi_{0.5}Co_{0.2}Mn_{0.3}O_2$), lithium nickel cobalt aluminate (such as $LiNi_{0.82}Co_{0.15}Al_{0.03}O_2$), and/or lithium iron phosphate ($LiFePO_4$), for example. Positive electrode composite material layer 12 may include only one type of the positive electrode active material. Positive electrode composite material layer 12 may include two or more types of the positive electrode active material.

Positive electrode composite material layer 12 may further include a conductive material. The conductive material is not particularly limited. The conductive material may be carbon black, for example. The amount of the conductive material may be, for example, not lower than 1 part by mass and not higher than 10 parts by mass relative to 100 parts by mass of the positive electrode active material.

Positive electrode composite material layer 12 may further include a binder. The binder is not particularly limited. The binder may be polyvinylidene difluoride (PVdF), for example. The amount of the binder may be, for example, not lower than 1 part by mass and not higher than 10 parts by mass relative to 100 parts by mass of the positive electrode active material.

<<Separator>>

Battery 100 may include separator 30. Separator 30 is interposed between positive electrode 10 and negative electrode 20. Separator 30 separates positive electrode 10 from negative electrode 20. Separator 30 is a porous film. Separator 30 is electrically insulating. Separator 30 may have a thickness not smaller than 5 μm and not greater than 50 μm, for example.

Separator 30 may be made of polyolefin, for example. Separator 30 may be made of polyethylene (PE), for example. Separator 30 may be made of polypropylene (PP), for example. Separator 30 may have a monolayer structure, for example. Separator 30 may consist of a porous PE film, for example. Separator 30 may have a multilayer structure. Separator 30 may be formed by, for example, stacking a porous PP film, a porous PE film, and a porous PP film in this order. Separator 30 may have a heat-resistant film on a surface thereof. The heat-resistant film includes a heat-resistant material. The heat-resistant material may be alumina, boehmite, titania, silica, and/or polyimide, for example.

In the configuration in which the non-aqueous electrolyte (described below) is solid (for instance, in the configuration in which battery 100 is an all-solid-state battery), separator 30 may be substantially unnecessary.

<<Non-Aqueous Electrolyte>>

Battery 100 includes a non-aqueous electrolyte. The non-aqueous electrolyte is a Li-ion conductor. The non-aqueous electrolyte may be liquid, for example. The non-aqueous electrolyte may be gel, for example. The non-aqueous electrolyte may be solid, for example. When the non-aqueous electrolyte is liquid, the liquid non-aqueous electrolyte may be electrolyte solution, ionic liquid, or the like. In the present specification, the non-aqueous electrolyte in the form of electrolyte solution is described as an example.

The electrolyte solution contains at least a Li salt and a solvent. The Li salt is dissolved in the solvent. The concentration of the Li salt may be, for example, not lower than 0.5 mol/L and not higher than 2 mol/L (not lower than 0.5 M and not higher than 2 M). The Li salt may be $LiPF_6$, $LiBF_4$, $LiN(FSO_2)_2$, and/or $LiN(CF_3SO_2)_2$, for example. The electrolyte solution may contain only one type of the Li salt. The electrolyte solution may contain two or more types of the Li salt.

The solvent is aprotic. The solvent may be a mixture of a cyclic carbonate and a chain carbonate, for example. The mixing ratio may be, for example:

(Cyclic carbonate):(chain carbonate)=1:9 to 5:5 (volume ratio).

The cyclic carbonate may be ethylene carbonate (EC), propylene carbonate (PC), butylene carbonate (BC), and/or fluoroethylene carbonate (FEC), for example. The solvent may include only one type of the cyclic carbonate. The solvent may include two or more types of the cyclic carbonate.

The chain carbonate may be dimethyl carbonate (DMC), ethyl methyl carbonate (EMC), and/or diethyl carbonate (DEC), for example. The solvent may include only one type of the chain carbonate. The solvent may include two or more types of the chain carbonate.

The solvent may include a lactone, a cyclic ether, a chain ether, and/or a carboxylate ester, for example. The lactone may be γ-butyrolactone (GBL) and/or δ-valerolactone, for example. The cyclic ether may be tetrahydrofuran (THF), 1,3-dioxolane, and/or 1,4-dioxane, for example. The chain ether may be 1,2-dimethoxyethane (DME), for example. The carboxylate ester may be methyl formate (MF), methyl acetate (MA), and/or methyl propionate (MP), for example.

The electrolyte solution may further contain various additives in addition to the Li salt and the solvent. The electrolyte solution may contain the additives in an amount not lower than 0.005 mol/L and not higher than 0.5 mol/L, for example. Examples of the additives include a gas generation agent (also called "anti-overcharging additive"), a solid electrolyte interface (SEI) film-forming agent, and a flame retardant.

The gas generation agent may be cyclohexylbenzene (CHB) and/or biphenyl (BP), for example. The SEI-filmforming agent may be vinylene carbonate (VC), vinylethylene carbonate (VEC), $LiB(C_2O_4)_2$, $LiPO_2F_2$, propane sultone (PS), and/or ethylene sulfite (ES), for example. The flame retardant may be a phosphoric acid ester and/or a phosphazene, for example.

<Method of Evaluating Negative Electrode Composite Material Layer>

Figure 7:
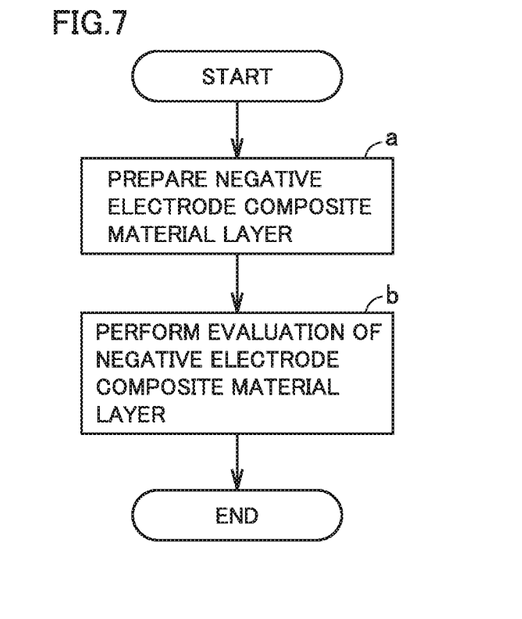
FIG. 7 is a flowchart schematically illustrating a method of evaluating a negative electrode composite material layer according to the present embodiment.

FIG. 7 is a flowchart schematically illustrating a method of evaluating a negative electrode composite material layer according to the present embodiment.

The method of evaluating a negative electrode composite material layer according to the present embodiment includes at least "(a) preparing a negative electrode composite material layer" and "(b) performing evaluation of the negative electrode composite material layer". The method of evaluating a negative electrode composite material layer according to the present embodiment may enable evaluation of how well conductive paths withstand the stretching that is caused by a volume change of a silicon oxide material.

<<(a) Preparing Negative Electrode Composite Material Layer>>

The method of evaluating a negative electrode composite material layer according to the present embodiment includes preparing negative electrode composite material layer 22. Negative electrode composite material layer 22 is described above in detail. More specifically, negative electrode composite material layer 22 includes a negative electrode active material, a conductive material, and a binder. The negative electrode active material includes a silicon oxide material and a graphite material. Negative electrode composite material layer 22 may be prepared by a conventionally known method.

<<(b) Performing Evaluation of Negative Electrode Composite Material Layer>>

The method of evaluating a negative electrode composite material layer according to the present embodiment includes performing evaluation of negative electrode composite material layer 22. The evaluation is carried out by the above-described procedure.

In the following, the specific procedure is described. Negative electrode composite material layer 22 is stretched by 1% in a direction orthogonal to a thickness direction of negative electrode composite material layer 22. The electrical resistance of negative electrode composite material layer 22 thus stretched is measured. The stretching is repeated in the same direction while each stretching is followed by the measurement.

A plot of values thus obtained by the measurement is made on an orthogonal coordinate system that has an abscissa representing the elongation of negative electrode composite material layer 22 and an ordinate representing the electrical resistance of negative electrode composite material layer 22 (FIG. 1).

Based on the elongation at a bending point in the plot, negative electrode composite material layer 22 is evaluated.

The bending point refers to one of two adjacent points in the plot that differ from each other in electrical resistance by greater than 0.1Ω. The bending point is the one with the smaller elongation.

The elongation at a bending point may indicate the strength of the conductive paths to withstand stretching. For instance, the elongation at a bending point may be used for screening and finding a suitable negative electrode composite material layer 22 (negative electrode 20).

In addition to the elongation at a bending point, the BET specific surface area of negative electrode composite material layer 22 may further be measured. In other words, both the elongation at a bending point and the BET specific surface area may be used for evaluating negative electrode composite material layer 22. For instance, whether the BET specific surface area is within the range of 3.5 $m^2/g$ to 5.0 $m^2/g$ may be used for the evaluation.

<Method of Producing Non-Aqueous Electrolyte Secondary Battery>

Figure 8:
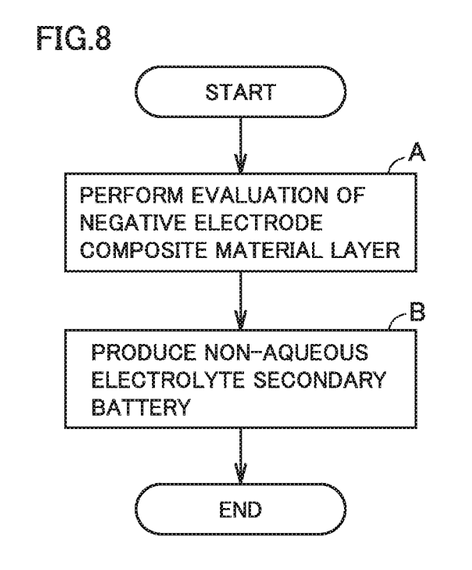
FIG. 8 is a flowchart schematically illustrating a method of producing a non-aqueous electrolyte secondary battery according to the present embodiment.

FIG. 8 is a flowchart schematically illustrating a method of producing a non-aqueous electrolyte secondary battery according to the present embodiment. The method of producing a non-aqueous electrolyte secondary battery according to the present embodiment includes at least "(A) performing evaluation of a negative electrode composite material layer" and "(B) producing a non-aqueous electrolyte secondary battery".

<<(A) Performing Evaluation of Negative Electrode Composite Material Layer>>

The method of producing a non-aqueous electrolyte secondary battery according to the present embodiment includes performing evaluation of negative electrode composite material layer 22 by the method of evaluating a negative electrode composite material layer according to the present embodiment. The method of evaluating a negative electrode composite material layer according to the present embodiment is described above in detail.

<<(B) Producing Non-Aqueous Electrolyte Secondary Battery>>

The method of producing a non-aqueous electrolyte secondary battery according to the present embodiment includes producing battery 100 that includes at least negative electrode composite material layer 22. Battery 100 is described above in detail. Battery 100 may be produced by a conventionally known method.

Negative electrode composite material layer 22 has an elongation at a bending point of 12% or higher. The negative electrode composite material layer has a BET specific surface area not smaller than 3.5 $m^2/g$ and not greater than 5.0 $m^2/g$. In other words, in "(A) performing evaluation of a negative electrode composite material layer", a negative electrode composite material layer 22 having an elongation at a bending point of 12% or higher and a BET specific surface area not smaller than 3.5 $m^2/g$ and not greater than 5.0 $m^2/g$ is selected. The selected negative electrode composite material layer 22 is used in battery 100.

In this way, the method of producing a non-aqueous electrolyte secondary battery according to the present embodiment may enable production of battery 100 that has an improved charge-discharge cycling performance and a mitigated degradation in high-temperature storage properties. For instance, electrode raw sheets (uncut sheets of negative electrode 20) may be subjected to screening. After the screening, a selected electrode raw sheet may be cut into negative electrode composite material layer 22 (negative electrode 20) for use in battery 100.

EXAMPLES

Next, examples according to the present disclosure are described. However, the description below does not limit the scope of claims.

Example 1

1. Producing Negative Electrode
The materials described below were prepared.
Negative electrode active material: SiO, graphite
Conductive material: CNT, graphene Binder: CMC, SBR
Solvent: ion-exchanged water
Negative electrode current collector: Cu foil (thickness, 10 μm)

"SiO" refers to a compound represented by the above formula (I) where x=1. SiO, graphite, CNT, graphene, CMC, and ion-exchanged water were mixed, and thereby a dispersion was prepared. To the resulting dispersion, SBR was added. The SBR addition was followed by further mixing the dispersion, and thereby a coating material was prepared. The solid matter mixing ratio was as follows:

SiO:graphite:CNT:graphene:CMC:SBR=5:95:1:1:1.5:
1.5 (mass ratio).

The coating material was applied to a surface of negative electrode current collector 21, followed by drying, and thereby negative electrode composite material layer 22 was formed. Negative electrode composite material layer 22 thus formed was compressed, and thereby an electrode raw sheet was produced. The resulting electrode raw sheet was cut, and thereby negative electrode 20 was produced. The dimensions of negative electrode 20 were described below.

Thickness of negative electrode 20 (dimension in the y-axis direction in FIG. 4), 144 μm Width of negative electrode composite material layer 22 (dimension in the x-axis direction in FIG. 4), 122 mm Length of negative electrode 20 (dimension in the z-axis direction in FIG. 4), 5835 mm According to the measurement methods described above, the elongation at a bending point and the BET specific surface area were measured. Measurement results are shown in Table 1 below.

2. Producing Positive Electrode

The materials described below were prepared.
Positive electrode active material: lithium nickel cobalt manganese oxide (NCM)
Conductive material: AB
Binder: PVdF
Solvent: N-methyl-2-pyrrolidone (NMP)
Positive electrode current collector: Al foil (thickness, 15 μm)

NCM, AB, PVdF, and NMP were mixed, and thereby a coating material was prepared. The solid matter mixing ratio was as follows:

NCM:AB:PVdF =93:4:3 (mass ratio).

The coating material was applied to a surface of positive electrode current collector 11, followed by drying, and thereby positive electrode composite material layer 12 was formed. Positive electrode composite material layer 12 thus formed was compressed, and thereby an electrode raw sheet was produced. The resulting electrode raw sheet was cut, and thereby positive electrode 10 was produced. The dimensions of positive electrode 10 were described below.

Thickness of positive electrode 10 (dimension in the y-axis direction in FIG. 6), 142 μm Width of positive electrode composite material layer 12 (dimension in the x-axis direction in FIG. 6), 117 mm Length of positive electrode 10 (dimension in the z-axis direction in FIG. 6), 5681 mm 3. Preparing Separator A substrate was prepared. The substrate was a porous film. The substrate was formed by stacking a porous PP film, a porous PE film, and a porous PP film in this order. The thickness of the substrate was 20 μm.

As a heat-resistant material, alumina (powder) was prepared. The heat-resistant material, a binder, and a solvent were mixed, and thereby a coating material was prepared. The resulting coating material was applied to a surface of the substrate, followed by drying, and thereby a heat-resistant film was formed. The thickness of the resulting heat-resistant film was 4 μm. In this way, separator 30 was prepared.

4. Preparing Non-Aqueous Electrolyte

As a non-aqueous electrolyte, an electrolyte solution was prepared. The composition of the electrolyte solution is described below.

Li salt: LiPF$_6$ (concentration, 1 mol/L)
Solvent: [EC:DMC:EMC=3:4:3 (volume ratio)]

5. Assembly

Positive electrode 10, separator 30, negative electrode 20, and separator 30 were stacked in this order and then wound in a spiral fashion. Thus, electrode array 50 was formed. The resulting electrode array 50 was shaped flat with a flat press. The shaping conditions are described below.

Shaping temperature: room temperature
Shaping pressure: 4 kN/cm$^2$
Shaping duration: 2 min Casing 101 was prepared. Casing 101 was prismatic. Positive electrode terminal 91 and negative electrode terminal 92 were connected to electrode array 50. Electrode array 50 was placed in casing 101. Into casing 101, 120 mL of the electrolyte solution was injected. Casing 101 was hermetically sealed.

Thus, battery 100 (non-aqueous electrolyte secondary battery) was produced. Battery 100 of examples of the present disclosure had a rated capacity of 35 Ah.

Examples 2 to 6

Battery 100 was produced in the same manner as in Example 1 except that the composition of the binder was changed as specified in Table 1 below.

Examples 7 and 8

Battery 100 was produced in the same manner as in Example 1 except that the composition of the conductive material was changed as specified in Table 1 below.

Comparative Examples 1 to 3

Battery 100 was produced in the same manner as in Example 1 except that the compositions of the conductive material and the binder were changed as specified in Table 1 below.

<Evaluation>
<<Cycle Test>>

500 cycles of charge and discharge were carried out in an environment at room temperature. A single cycle consisted of "CC charging" and "CC discharging", which are described below.

CC charging: rate=2 CA, cut-off voltage=4.1 V
CC discharging: rate=2 CA, cut-off voltage=3.0 V "CC" refers to a constant-current mode. At a rate of 1 CA, discharging from the rated capacity completes in one hour. For example, at a rate of 2 CA, discharging from the rated capacity completes in 30 minutes.

Table 1 below shows discharged capacity measured after the 500th cycle. Each value in column "500 cyc discharged capacity" in Table 1 below is the discharged capacity measured after the 500th cycle in each example divided by the discharged capacity measured after the 500th cycle in Comparative Example 1. The higher the discharged capacity measured after the 500th cycle is, the more improved the charge-discharge cycling performance may have been.

<<High-Temperature Storage Test>>

The pre-storage discharged capacity of battery 100 was measured. Conditions for the capacity measurement are described below.

CCCV charging: CC charging rate=⅓ CA, CV charging voltage=4.1 V, cut-off current=1/20 CA CCCV discharging: CC discharging rate=⅓ CA, CV discharging voltage=2.5 V, cut-off current=1/20 CA "CCCV" refers to a constant current-constant voltage mode.

The state of charge (SOC) of battery 100 was adjusted to 100%. Battery 100 was stored for two weeks in a thermostatic chamber set at 60° C. After the two-week storage, discharged capacity was measured in the same manner as in the pre-storage measurement. The post-storage discharged capacity thus measured was divided by the pre-storage discharged capacity, and thus capacity restoration was calculated. Results are shown in Table 1 below. Each value in column "Capacity restoration" in Table 1 below is the capacity restoration in each example divided by the capacity restoration in Comparative Example 1. The closer the capacity restoration is to 1, the more mitigated the degradation in storage properties may have been.

gation at a bending point is lower than 12%. In Comparative Example 3, the BET specific surface area is lower than 3.5 m²/g. These may have been caused by the excessively high amount of the binder compared to the amount of the conductive material. It may have caused an increase in electrical resistance and prevented an increase in elongation at a bending point from reaching a great value.

In Examples 1 to 8, the elongation at a bending point is 12% or higher and the BET specific surface area is not smaller than 3.5 m²/g and not greater than 5.0 m²/g. FIG. 1 illustrates the relation between elongation and electrical resistance measured in Example 1.

In Examples 1 to 8, compared to Comparative Example 1, the charge-discharge cycling performance is improved. The following tendency is observed: the greater the elongation at a bending point is, the more improved the charge-discharge cycling performance is. The high-temperature storage properties in Examples 1 to 8 are equivalent to those in Comparative Example 1. This means that degradation in high-temperature storage properties was mitigated.

In Examples 1 to 8, elongation at a bending point is great. It may be because the amount of the binder is higher than the amount of the conductive material.

Among Examples 1, 7, and 8, the following tendency is observed: elongation at a bending point when the conductive

TABLE 1

| | Negative electrode composite material layer | | | | | | | | Evaluation | |
|---|---|---|---|---|---|---|---|---|---|---|
| | Composition | | | | | | | | | |
| | Negative electrode active material | | Conductive material | | Binder | | | | Cycle test | High-temperature |
| | SiO$_x$ parts by mass | Graphite parts by mass | CNT parts by mass | Graphene parts by mass | CMC parts by mass | SBR parts by mass | CMC + SBR parts by mass | Elongation at bending point % | BET specific surface area m²/g | 500 cyc discharged capacity | storage test Capacity restoration |
| Ex. 1 | 5 | 95 | 1 | 1 | 1.5 | 1.5 | 3 | 14 | 5.0 | 1.47 | 1 |
| Ex. 2 | 5 | 95 | 1 | 1 | 2.5 | 2.5 | 5 | 14 | 3.5 | 1.47 | 1 |
| Ex. 3 | 5 | 95 | 1 | 1 | 2 | 1 | 3 | 14 | 5.0 | 1.47 | 1 |
| Ex. 4 | 5 | 95 | 1 | 1 | 1 | 2 | 3 | 14 | 5.0 | 1.47 | 1 |
| Ex. 5 | 5 | 95 | 1 | 1 | 3.5 | 1.5 | 5 | 14 | 3.5 | 1.47 | 1 |
| Ex. 6 | 5 | 95 | 1 | 1 | 1.5 | 3.5 | 5 | 14 | 3.5 | 1.47 | 1 |
| Ex. 7 | 5 | 95 | 2 | 0 | 1.5 | 1.5 | 3 | 12 | 5.0 | 1.31 | 1 |
| Ex. 8 | 5 | 95 | 0 | 2 | 1.5 | 1.5 | 3 | 13 | 5.0 | 1.36 | 1 |
| Comp. Ex. 1 | 5 | 95 | 0 | 0 | 1 | 1 | 2 | 8 | 5.0 | 1 | 1 |
| Comp. Ex. 2 | 5 | 95 | 1 | 1 | 1 | 1 | 2 | 14 | 5.7 | 1.47 | 0.9 |
| Comp. Ex. 3 | 5 | 95 | 1 | 1 | 3.5 | 3.5 | 7 | 10 | 3.2 | 1.08 | 1 |

<Results>

In Comparative Example 1, the charge-discharge cycling performance is low. In Comparative Example 1, the elongation at a bending point is lower than 12%. Therefore, there may have been a high likelihood of loss of conductive paths between a silicon oxide material and a graphite material during charge-discharge cycles. In Comparative Example 1, the elongation at a bending point is low, which may have been attributed to the absence of conductive material. FIG. 1 illustrates the relation between elongation and electrical resistance measured in Comparative Example 1.

In Comparative Example 2, degradation in high-temperature storage properties is observed. It may be because the BET specific surface area of the negative electrode composite material layer increased due to addition of the conductive material to a value greater than 5.0 m²/g.

In Comparative Example 3, charge-discharge cycling performance is low. In Comparative Example 3, the elonmaterial includes both CNT and graphene is greater than that when the conductive material includes only either CNT or graphene.

The embodiments and examples disclosed herein are illustrative and non-restrictive in any respect. The technical scope indicated by the claims is intended to include any modifications within the scope and meaning equivalent to the terms of the claims.

What is claimed is:

1. A non-aqueous electrolyte secondary battery, comprising at least:
    a negative electrode composite material layer,
    the negative electrode composite material layer including
        a negative electrode active material, a conductive material, and a binder,
    the negative electrode active material including a silicon oxide material and a graphite material, the negative electrode composite material layer having a BET specific surface area not smaller than 3.5 m$^2$/g and not greater than 5.0 m$^2$/g, wherein the negative electrode composite material layer is configured such that, in a plot made for the negative electrode composite material layer, an elongation at a bending point in the plot being 12% or higher, the plot being made by:

stretching the negative electrode composite material layer by 1% in a direction orthogonal to a thickness direction of the negative electrode composite material layer;

performing measurement of an electrical resistance of the negative electrode composite material layer thus stretched;

repeating the stretching in the same direction while each stretching is followed by the measurement; and making a plot of values thus obtained by the measurement, the plot being made on an orthogonal coordinate system, the orthogonal coordinate system having an abscissa representing the elongation of the negative electrode composite material layer and an ordinate representing the electrical resistance of the negative electrode composite material layer, wherein the binder includes carboxymethylcellulose and styrene-butadiene rubber, wherein the conductive material includes carbon nanotubes and graphene, and wherein the graphene is in the form of flakes.

2. The non-aqueous electrolyte secondary battery according to claim 1, wherein an amount of the binder expressed in part by mass is higher than an amount of the conductive material expressed in part by mass.

3. The non-aqueous electrolyte secondary battery according to claim 1, wherein the amount of the binder is not lower than 3 parts by mass and not higher than 5 parts by mass relative to 100 parts by mass of the negative electrode active material.

4. A method of evaluating a negative electrode composite material layer, the method comprising at least:

preparing a negative electrode composite material layer; and performing evaluation of the negative electrode composite material layer, the negative electrode composite material layer including a negative electrode active material, a conductive material, and a binder, the negative electrode active material including a silicon oxide material and a graphite material, the evaluation of the negative electrode composite material layer being performed based on an elongation of the negative electrode composite material layer at a bending point in a plot made by:

stretching the negative electrode composite material layer by 1% in a direction orthogonal to a thickness direction of the negative electrode composite material layer;

performing measurement of an electrical resistance of the negative electrode composite material layer thus stretched;

repeating the stretching in the same direction while each stretching is followed by the measurement; and making a plot of values thus obtained by the measurement, the plot being made on an orthogonal coordinate system, the orthogonal coordinate system having an abscissa representing the elongation of the negative electrode composite material layer and an ordinate representing the electrical resistance of the negative electrode composite material layer.

5. A method of producing a non-aqueous electrolyte secondary battery, the method comprising at least:

performing evaluation of the negative electrode composite material layer using the method of evaluating a negative electrode composite material layer according to claim 4; and producing a non-aqueous electrolyte secondary battery including at least the negative electrode composite material layer, the negative electrode composite material layer having an elongation at the bending point of 12% or higher, the negative electrode composite material layer having a BET specific surface area not smaller than 3.5 m$^2$/g and not greater than 5.0 m$^2$/g.

6. The non-aqueous electrolyte secondary battery according to claim 1, wherein the graphene has a D50 not lower than 2 µm and not higher than 20 µm, and the graphene has an aspect ratio not lower than 150 and not higher than 700.

7. The non-aqueous electrolyte secondary battery according to claim 1, wherein the carbon nanotubes have an average diameter not smaller than 0.4 nm and not greater than 40 nm, and the carbon nanotubes have an average length not smaller than 10 nm and not greater than 15 µm.

8. The non-aqueous electrolyte secondary battery according to claim 1, wherein the amount of the conductive material is from 1 to 5 parts by mass relative to 100 parts by mass of the negative electrode active material.

* * * * *